Jan. 5, 1943.   H. E. LAWSON   2,307,627
DRY CELL AND METHOD OF MAKING THE SAME
Filed Nov. 9, 1939
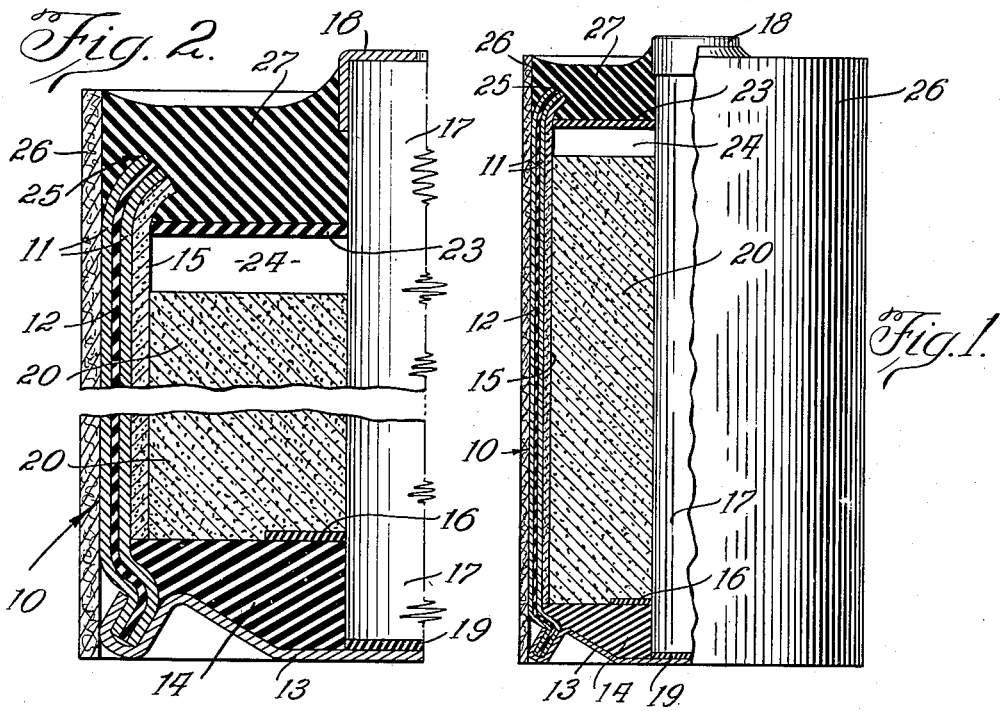
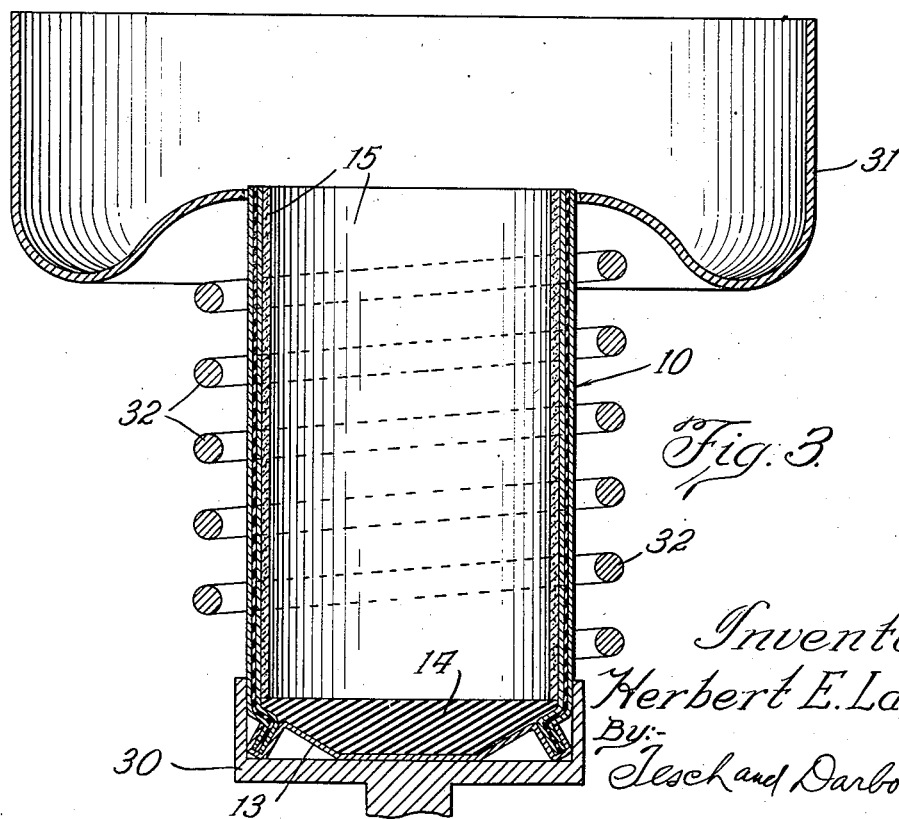
Inventor:
Herbert E. Lawson
By:- Tesch and Darbo Att'ys.

Patented Jan. 5, 1943

2,307,627

UNITED STATES PATENT OFFICE 2,307,627

DRY CELL AND METHOD OF MAKING THE SAME

Herbert E. Lawson, Chicago, Ill., assignor, by mesne assignments, to Burgess Battery Company, Chicago, Ill., a corporation of Delaware Application November 9, 1939, Serial No. 303,592

13 Claims. (Cl. 136—107)

This invention relates to improvements in dry cells and the method of making such cells. A dry cell usually includes a carbon positive electrode which is surrounded by a body of depolarizing material, this body being separated from the metal negative electrode by a layer of paper, gelatinized starch, or other suitable material, which is absorbent of the liquid electrolyte of the cell. An important feature of the present invention is an improvement in the method of incorporating the layer of separating material between the metal electrode and the depolarizing material, which method results in an improved dry cell construction and improved operating properties of the cell. In accordance with the invention, a layer of starch is applied to the surface of the metal electrode in a manner which is simple and easily controlled and results in an even layer. In addition, the layer is adapted to maintain relatively high compression between the cell electrodes and thereby reduce contact resistance within the cell. As a further feature of improvement, the layer is applied to a greater portion of the surface of the metal electrode than has been the practice heretofore.

It is an object of the invention to provide an improved method of applying the starch layer to the metal electrode which is simple and lends itself satisfactorily to rapid plant production methods.

It is a further object of the invention to provide a starch layer upon the metal electrode which is uniform in thickness and which results in an advantageous decrease in contact resistance between the cell electrodes.

The invention will be described in connection with the cylindrical type of dry cell employing an open-top zinc can and a carbon rod as the electrodes.

Briefly, the invention contemplates the application of an adherent layer of ungelatinized starch particles, or granular starch, to the interior cylindrical surface of the zinc can by a centrifugal operation, the starch layer extending to the top edge of the can. If desired, the layer can be applied in such a manner that it is thicker at the lower cylindrical portion of the can than at the top. In service, the lower portion of the can may be consumed at a more rapid rate than the upper portion and the increased thickness of starch layer counteracts any such tendency toward uneven consumption. The starch is caused to gelatinize and swell after the depolarizing material has been compacted in place, with the result that the compression within the depolarizing material and between it and the electrodes is increased and the contact resistance of the cell is decreased.

Heretofore the separating layer between the can and depolarizing material has been formed by inserting a sheet of moisture absorbent material, such as blotting paper, plaster of Paris, etc., against the can surface and then compacting the depolarizing material within this lining. If a preformed core of depolarizing material is used, this is inserted centrally in to the can and is separated from the walls of the can by a liquid starch suspension. The starch is caused to become gelatinized to a sufficient degree of solidity to maintain the core in position out of contact with the can.

The first method has the disadvantage that the insertion of the absorbent sheet is laborious, particularly in the case of small cells, and requires the heavy tamping of the depolarizing mixture to obtain the compactness essential to efficient operation of the cell. The second method has the disadvantage that the preformed core must be free of loose particles upon its surface, and must be centered accurately in the can and maintained in such position until the starch suspension has solidified. If there are loose particles upon the core surface, these may bridge the space between the core and the can and cause severe local action or even a short circuit within the cell. It is common practice to wrap the core in a moisture absorbent material, such as cheesecloth, to prevent the separation of particles from the surface.

The present invention provides a method of applying a separating layer which is free of the above disadvantages, and which is simple and adapted to be readily carried out and controlled. The invention provides a separating layer which is of even, regulable thickness. In addition, it provides a separating layer which provides decreased contact resistance between the cell electrodes with resulting increased efficiency in the electrolytic action of the cell.

In the drawing:

Fig. 1 is an elevation, partly in section, of the improved dry cell of this invention, Fig. 2 is an enlarged fractional view, in section of the improved dry cell, and Fig. 3 is a diagrammatic illustration of an apparatus suitable for applying the layer of starch to the interior of the dry cell can.

In Figs. 1 and 2 a dry cell is illustrated in which the metal electrode is in the form of an open-top cylindrical zinc can 10. This may be a seamless drawn zinc can or a soldered can, both of which are well known in the art, or it may be a multiple-layer can, formed by rolling a thin sheet of zinc into an open-ended cylinder having a plurality of superposed layers of the sheet zinc, and applying a closure to one end of the cylinder. An adhesive material, such as vinyl acetate resin, is preferably applied to the surface of the zinc in such manner as to form a layer of the adhesive between the superposed zinc layers. This multiple-layer zinc can construction is described and claimed in the co-pending application of Charles F. Burgess Serial No. 102,530, filed September 25, 1936, now Patent 2,231,320. In Fig. 1, a can comprising two layers 11 of zinc and an intervening layer 12 of adhesive is shown. For the bottom, or end cap 13, of the can, a zinc disc is crimped adjacent its circumference over the bottom edge portion of the multiple-layer zinc cylinder to form a liquid-tight joint. In place of the crimped disc, the end cap may be composed of heavy paper or other suitable material coated or impregnated with pitch, paraffin or other suitable water and electrolyte resisting material, suitably held in position, or it may be of a synthetic resin or a fusible sealing compound such as is commonly used for the top closure of cells. In the form illustrated, the central portion of the metal end cap 13 is displaced outwardly to a point substantially even with the bottom rim formed by the crimped portion. A layer of heat fusible electrical insulating material 14, such as wax or pitch, is inserted in the can and covers the bottom thereof. This material is poured into place in the fused condition and covers the joint between the cylinder and the end cap, and seals the joint against any possible leakage of electrolyte.

A layer of ungelatinized starch 15 is applied to the interior cylindrical surface of the zinc can. In accordance with the present invention, this layer is applied by centrifugal action. For this purpose, a quantity of an aqueous suspension of particles of a suitable starch, such as potato starch, cornstarch or the like, in granular, ungelatinized condition, is placed in the zinc can, and the can is then rotated, or spun, about its axis with the result that the suspension is projected against the can interior cylindrical surface. The starch is suspended in an aqueous liquid which does not have any appreciable gelatinizing action upon the starch. Water is preferred, but it may contain electrolyte substances, such as ammonium chloride, zinc chloride, sodium dichromate, mercuric chloride, and others. These substances either do not have a gelatinizing effect on the starch or are used in such small quantities as not to cause a substantial gelatininzing action.

An apparatus suitable for applying the starch layer to the can surface is illustrated diagrammatically in Fig. 3. This comprises a suitable support or platform 30 adapted to be rotated about a vertical axis. The dry cell can 10, containing a quantity of the starch suspension, is placed in vertical position upon support 30 and is rotated about the axis of its cylinder. The starch suspension is projected by centrifugal force against the interior surface of the can and arranges itself along this surface. A portion of the suspension is expelled over the top edge of the can during the early part of the spinning operation. A separation of the remaining liquid and starch then takes place, the starch being projected against the can surface and the liquid forming a layer against the starch. The liquid then rises in the can and is ejected radially over the top edge, leaving a moist layer of ungelatinized starch adhering to the surface of the can. An annular receptacle 31 is provided surrounding the top portion of the can to catch the ejected liquid which may be re-used.

The thickness of the starch layer depends upon the concentration of the suspension used, and the speed of rotation during spinning. Higher concentrations, and slower speeds, both tend to produce a thicker layer. A relatively slow speed produces a layer which increases in thickness toward the bottom of the can. It is preferred to use a concentrated suspension because when such a suspension is spun in the can, most of the small amount of liquid contained therein is readily expelled over the top edge, and the remaining layer of starch is relatively thick. A more dilute suspension may be used, however. Such a suspension results in a thinner layer of starch, and the concentration of the suspension may, therefore, be used as a means for regulating the thickness of the layer. It is not necessary to measure accurately the quantity of suspension placed in the can. When employing sweet potato starch and water, a suspension containing one part by weight of starch to approximately one to 20 parts of water is preferred, and other proportions may be used if desired. When employing a different type of starch, or an electrolyte solution, the proportions are different from those of a potato starch and water suspension of corresponding consistency.

The starch layer remaining after the spinning operation is moist. It adheres to the can surface and is sufficiently solid and cohesive to withstand the handling to which it is subjected. If desired, a suitable adhesive, such as glue, etc., may be added to the suspension to strengthen the layer. It may contain a slight amount of gelatinized starch, which acts as an adhesive. There should not be enough gelatinized starch to alter the character of the layer as being essentially a solid mass of ungelatinized particles. When the freshly formed layer is pressed with the finger, moisture may be seen at the surface in the immediately adjacent area, but otherwise, the layer appears dry to the eye. Some of this moisture dries out rather readily, leaving a hard layer of granular starch.

For rapid plant production, it may be desirable to accelerate the removal of moisture from the starch layer, and this may be accomplished by blowing a current of air, preferably warm air, over the top of the can, or into the can, or by heating the can mildly during the spinning operation. For the latter purpose, an electric heating coil 32, as indicated in Fig. 3, may be employed. The heating is regulated so that during the time that the dry cell can is subjected to the spinning operation, the starch layer is heated to a temperature which is suitable for evaporating moisture but is not high enough to gelatinize or bake the starch, or effect any physical or chemical change in it.

After the starch layer has been formed upon the can surface, the can may be stored for any period of time until it is desired to complete the manufacture of the dry cell. Normally, this occurs immediately, and the next step is the insertion of a layer of electrical insulating and electrolyte resisting sheet material 16, such as paraffin, asphalt or pitch impregnated pulp board or cardboard, upon the central portion of pitch seal 14. This is followed by the insertion of the liquid electrolyte and the depolarizing material into the can. In accordance with the present invention, it is preferred to incorporate the electrolyte in the depolarizing material prior to the introduction of the latter into the can. For this purpose, the liquid electrolyte, containing a suitable electrolyte salt, such as ammonium chloride, zinc chloride, etc., or a mixture of such salts, is mixed thoroughly with powdered depolarizing material, such as manganese dioxide, and powdered electrical conducting material, such as graphite, carbon black, etc. Sufficient electrolyte solution is used to supply the electrolyte requirements of the dry cell. This results in a mixture which is somewhat more moist and plastic than that which is used in the usual practice in which the electrolyte solution and the depolarizing mixture are introduced separately into the dry cell can.

A suitable quantity of the moist mixture of depolarizing material and electrolyte is introduced into the can 10. It may be desirable to compact the material prior to its introduction, and for this purpose the material may conveniently be extruded or molded under pressure into the form of a cylinder slightly smaller than the internal diameter of the starch layer 15. If such preformed body, or core, of depolarizing material is used, this is inserted in the can, and compressed to the desired degree of compactness, and the carbon rod 17, having a metal cap 18 at its top end, is forced under pressure into and through the depolarizing mass 20 and the insulating sheet 16 and pitch seal 14. Although wax or pitch 14 is solid when cool, it is sufficiently soft to permit the embedment described. The central portion 19 of the insulating layer 16 is severed from the remainder of the layer by the end of the carbon rod, and is moved downwardly by the carbon rod until it engages the can bottom 13. The portion 19 serves to insulate the can from the carbon rod. The insulating sheet 16 may be placed beneath, instead of above, the pitch layer 14. In the construction described, in effect, the carbon rod presses against the can bottom. This strengthens the cell and prevents the bottom of the can from being bent upwardly when subjected to pressure or impact. In addition, the wax or pitch layer 14 prevents access of the electrolyte to the can bottom whereby the bottom may be composed of a different metal from that of the cylindrical portion of the can.

A top washer 23 of electrical insulating and electrolyte resisting material, such as treated cardboard or paper board or other suitable material, is inserted in spaced relation to the top of the depolarizing body 20. The washer 23 surrounds the carbon rod 17 and extends to the starch layer 15 to enclose an expansion space 24 above the depolarizing body. The washer 23 may be placed about the carbon rod before the latter is inserted in the cell. After the washer 23 is in position, the top edge portion 25 of the zinc can is turned inwardly as shown in Fig. 2. A cylindrical jacket of electrical insulating and electrolyte resisting material 26 is then fitted over the zinc can. Such jacket may be composed of fiberboard or cardboard, and the upper edge is arranged to extend a short distance above the turned-in edge portion 25 of the zinc can. A fusible sealing material, composed of wax or pitch, or any suitable material such as is commonly used for the seal closures of dry cells, is poured in the molten condition upon the top of washer 23 to form an hermetic seal closure 27. Closure 27 is arranged to embed the turned-in edge portion 25 of the can and fill the portion of the jacket 26 extending above the zinc can. The metal cap 18 is arranged to be exposed through the closure 27.

After the depolarizing body 20 is compacted into position, the starch layer acts to absorb some of the liquid therefrom and if this contains any starch-gelatinizing ingredients, such as zinc chloride, these cause the progressive gelatinization of the starch. The gelatinization of the starch is accompanied by a swelling thereof, with the result that the starch layer and depolarizing body are placed under an increased compression over that due to the tamping of the depolarizing body. This increase of compression is of a very substantial degree and as a consequence, results in a decrease in the contact resistance between the electrodes of the cell. As a result, the energy delivering ability of the cell is increased, and it has been found that dry cells of this invention have a higher capacity for delivering electrical energy than cells employing the ordinary gelatinized starch separating layer.

It is not essential that the electrolyte contain a starch-gelatinizing ingredient. Zinc chloride is such an agent and it may be omitted from the electrolyte. In such case the starch remains ungelatinized and absorbs a relatively small amount of the electrolyte until it is placed in operation. As a result, there is considerably less than the usual local action and deterioration during storage of the cell. Upon the cell being placed in operation, zinc chloride is generated at the can surface by electrolytic action. This zinc chloride progressively gelatinizes the starch with the resulting swelling and benefits which have been explained heretofore.

An important advantage of the invention is that the separating layer is of even thickness. Any irregularities in the thickness would result in uneven consumption of the zinc. Furthermore, as has been pointed out heretofore, the thickness of the layer is readily controlled by regulating the concentration of the starch suspension and the speed of spinning the can, and it is not necessary to measure accurately the quantity of suspension placed in the can before the spinning operation. Also, by properly regulating the speed of spinning, the separating layer may be made to increase in thickness toward the bottom of the cell, and overcome any tendency toward increased zinc consumption in the lower portion of the can.

As another advantage, the starch layer is applied to the entire interior cylindrical surface of the zinc can and extends through the air space 24 above the depolarizing body. This protects the can from any particles of depolarizing material which may break loose from the main body. Such particles otherwise cause severe local action.

The method of this invention lends itself well to rapid plant production. It represents a simple method of applying the starch layer and one which can be carried out rapidly. Automatic measuring means may be used for measuring the quantity of suspension inserted in the can, and the can needs to be in the spinning apparatus only a few moments when it can be removed and passed to the next operation.

The invention is not limited to the type of dry cell in which zinc is used for the negative electrode. Any other suitable metal, such as magnesium, iron, etc., may be used depending upon the type of dry cell being made. Likewise, the invention is not limited to the use of a layer of granular starch between the can and the depolarizing material. Other cereals, and clays, powdered silica, etc., may be applied to the can surface by the method of the invention if it is desired to employ such separating materials. The invention is not limited to the use of the electrolyte salts mentioned heretofore, and any suitable electrolyte materials may be used as may be desired.

The dry cell can may be in other than the vertical position during the spinning operation. For example, it may be in the horizontal position, and the starch suspension may be introduced progressively while the can is undergoing spinning.

The depolarizing mixture need not receive a preliminary compacting into the form of a core before it is introduced into the cell, but may be introduced in a loose condition and compacted by a tamping operation in situ in the cell. In such method, as is well known to those skilled in the art, the tamping is preferably begun with the introduction of the first portions of the depolarizing material and continued until it has all been introduced. In this way, the final depolarizing mass is of uniform consistency.

The invention lends itself to the making of a deferred action type of cell, in which the electrolyte is omitted to produce a state of inactivity, until it is desired to place the cell in action. For this purpose, the starch is applied in the same manner as described heretofore, and the depolarizing body 20 is placed in position in a substantially dry condition, and the carbon rod 17 inserted. When it is desired to place the cell in action, the electrolyte liquid is introduced and moistens the depolarizing material and the starch layer and renders the cell available for the delivery of energy. To complete the cell, the top edge portion 25 of the can is turned inwardly and the top washer 23 and seal closure 27 are applied.

The method of this invention is adapted for augmenting the quantity of metal available at the metal electrode for electrolytic consumption. Where a zinc electrode is used, powdered zinc may be incorporated in the starch suspension and when the can is spun with the suspension in it, the powdered zinc, being heavier than the other ingredients, is projected against the electrode surface and is held in such position by the starch layer, and is available for utilization in the electrolytic action of the cell.

The invention is adapted for the manufacture of so-called miniature dry cells, such as are used for the batteries of portable radio sets, hearing aids, and other systems which require small multiple cell batteries. The application of the starch separating layer by the centrifugal operation described herein is capable of being adapted with simple technique and entirely satisfactory results to cells in which the diameter of the cylindrical zinc electrode is as little as ¼ inch.

When the terms "granular starch" or "starch granules" or similar terms are used herein, they are intended to mean particles of ungelatinized starch. It is understood that when ungelatinized starch, or substantially ungelatinized starch, is referred to in the specification and claims, this is intended to include a starch in which some gelatinization may have occurred but not enough to prevent ready separation of liquid during the spinning operation and the formation of an adherent, substantially solid layer, the major proportion of which is capable of undergoing gelatinization, upon the can surface.

I claim:

1. The method of making a dry cell which comprises forming a metal electrode in the form of an open-top cylindrical can, placing in said can a quantity of an aqueous suspension of starch granules comprising one part by weight of starch granules to approximately 1 to 20 parts of water, spinning said can about its axis to expel liquid from the starch suspension over the top edge of said can and leave an adherent layer of granular starch on the interior surface of said can, inserting electrolyte and a mass of depolarizing material under compression in said can, inserting a carbon electrode in said depolarizing mass, and forming an hermetic seal closure at the open end of said can.

2. The method of making a dry cell which comprises placing a quantity of an aqueous suspension of starch granules in an open-top cylindrical metal can, spinning said can about its axis to expel liquid from said suspension over the top edge of said can and leave an adherent layer of starch upon the interior surface of said can, inserting into said can under compression depolarizing mixture, electrolyte and a rod-form positive electrode, and forming a closure at the open top of said can.

3. The method of making a dry cell which comprises inserting a quantity of a suspension of starch granules in an open-top cylindrical metal can, spinning said can about its axis to expel liquid from said suspension over the top edge of said can and leave an adherent layer of starch upon the interior surface of said can, inserting in said can under compression depolarizing material, electrolyte and a positive electrode, turning inwardly the top edge portion of said can, and forming a closure for the open top of said can, said closure embedding the said turned-in edge portion of said can.

4. In making a dry cell having a cylindrical metal can, the method of forming a separating layer upon the interior surface of said can, which comprises placing in said can a quantity of an aqueous suspension of particles of substantially ungelatinized starch, spinning said can about its axis to expel liquid from said suspension over the top edge of said can and leave a layer of substantially ungelatinized starch upon the said interior surface of said can.

5. In making a dry cell having a cylindrical metal electrode, the method of forming a separating layer upon the interior surface of said electrode, which comprises arranging said electrode with its axis extending generally vertical, spinning said electrode about its axis with an aqueous suspension of starch particles therein to expel liquid from said suspension over the top edge of said electrode and leave a layer of starch particles upon the said interior surface of said electrode, the speed of spinning being such that the thickness of said starch layer is greater at the lower portion of said electrode than at the top.

6. In a dry cell having a cylindrical metal electrode, a positive electrode and a body of depolarizing material between said electrodes, a layer of starch in adherent relation to said metal electrode and extending between said metal electrode and said body of depolarizing material, said layer of starch gradually increasing in thickness from one end of said cylindrical metal electrode to the other.

7. In a primary dry cell having a cylindrical electrode of metal, a layer of discrete particles of similar metal arranged in contact with the interior cylindrical surface of said electrode and a layer of electrolyte containing substance arranged interiorly of said layer of metal particles.

8. The method of forming a separating layer upon an open-ended cylindrical metal electrode for a dry cell, which comprises introducing within said electrode an aqueous suspension of particles of starch, rotating said electrode about its axis to expel liquid from said suspension beyond the edge of the open end of said electrode and leave an adherent layer of starch upon the interior surface of said electrode.

9. The method of forming a separating layer upon the surface of an imperforate metal electrode for a dry cell, which comprises arranging said surface so as to form at least a portion of the interior surface of a hollow, open-ended cylinder, introducing within said cylinder a liquid suspension of particles of starch, rotating said cylinder about its axis to expel liquid from said suspension beyond the edge of said electrode and leave an adherent layer of starch particles upon said surface of said electrode.

10. The method of forming a separating layer upon the surface of an open-ended cylindrical metal electrode for a dry cell, which comprises introducing within said electrode a liquid suspension of particles of separating material, said particles having a density greater than that of said liquid, rotating said electrode about its axis to expel liquid from said suspension beyond the edge of the open end of said electrode and leave an adherent layer of particles upon the interior surface of said electrode.

11. The method of forming an adherent layer upon the interior surface of an open-ended cylindrical dry cell electrode which comprises introducing within said electrode a liquid suspension of particles, said particles having a density greater than that of said liquid, revolving said electrode about its axis to expel liquid from said suspension beyond the edge of the open end of said electrode and leave an adherent layer of said particles upon the interior surface of said electrode.

12. The method of forming a separating layer upon the surface of an imperforate metal electrode for a dry cell, which comprises arranging said surface so as to form at least a portion of the interior surface of a hollow, open-ended cylinder, introducing within said cylinder a liquid suspension of particles, said particles having a density greater than that of said liquid, rotating said cylinder about its axis to expel liquid from said suspension beyond the edge of said electrode and leave an adherent layer of said particles on said surface of said electrode.

13. In making a dry cell having an open-ended cylindrical electrode composed of metal, the method of augmenting the metal content of said electrode, which comprises introducing within said electrode a liquid containing particles of said metal in suspension, said metal having a density greater than that of said liquid, and spinning said electrode about its axis to expel liquid from said suspension beyond the edge of said electrode and leave an adherent layer of metal particles upon said surface of said electrode.

HERBERT E. LAWSON.